United States Patent [19]

Dauber et al.

[11] Patent Number: 5,761,184
[45] Date of Patent: Jun. 2, 1998

[54] VIBRATION DAMPING ARTICLE

[75] Inventors: Edwin G. Dauber, Chesapeake city, Md.; Michele Marie Gentile, Newark, Del.; Frank Santo Principe, Landenberg, Pa.

[73] Assignee: W. L. Gore & Associates, Inc., Newark, Del.

[21] Appl. No.: 636,120

[22] Filed: Apr. 22, 1996

[51] Int. Cl.$^6$ .............................. B32B 27/06; G11B 33/14
[52] U.S. Cl. .................. 369/247; 360/97.02; 428/317.7; 428/319.3; 428/422
[58] Field of Search .................. 428/316.6, 317.7, 428/319.3, 421, 422, 461; 360/97.02; 369/247

[56] References Cited

U.S. PATENT DOCUMENTS

| | | | |
|---|---|---|---|
| 3,429,405 | 2/1969 | Frigger | 188/73 |
| 3,953,566 | 4/1976 | Gore | 264/288 |
| 4,202,380 | 5/1980 | Bader | 139/368 |
| 4,439,484 | 3/1984 | Mori | 428/318.4 |
| 4,577,735 | 3/1986 | Mooney et al. | 188/268 |
| 4,607,751 | 8/1986 | Straccia, Sr. et al. | 211/41 |
| 4,628,500 | 12/1986 | Thigpen et al. | 369/249 |
| 4,720,400 | 1/1988 | Manniso | 427/243 |
| 4,760,478 | 7/1988 | Pal et al. | 360/104 |
| 4,922,354 | 5/1990 | Edwards | 390/97.03 |
| 5,128,209 | 7/1992 | Sakai et al. | 428/421 |
| 5,149,048 | 9/1992 | Morehouse et al. | 248/632 |
| 5,182,901 | 2/1993 | Stahlecker | 57/135 |
| 5,232,073 | 8/1993 | Bronowicki et al. | 188/378 |
| 5,294,085 | 3/1994 | Lloyd et al. | 248/562 |
| 5,332,371 | 7/1994 | Dantlgraber et al. | 417/363 |
| 5,374,473 | 12/1994 | Knox et al. | 428/218 |
| 5,397,628 | 3/1995 | Crawley et al. | 428/246 |
| 5,417,743 | 5/1995 | Dauber | 96/13 |
| 5,491,882 | 2/1996 | Walston et al. | 29/419.1 |

FOREIGN PATENT DOCUMENTS

92/13205  8/1992  WIPO.

OTHER PUBLICATIONS

Literature—"Teflon® Fluorocarbon Resin—Mechanical Design Data" 2 pages. (no date).

*Primary Examiner*—Marion E. McCamish
*Assistant Examiner*—Blaine R. Copenheaver
*Attorney, Agent, or Firm*—Victor M. Genco, Jr.

[57] ABSTRACT

The present invention advances the art of vibration damping material constructions known to date. In one aspect of the present invention, a vibration damping article comprises at least one layer of polytetrafluoroethylene (PTFE). The vibration damping article of the present invention may also comprise at least one adhesive layer for mounting to an object of interest. The vibration damping article of the present invention may also comprise at least one constrained layer, such as a metal or polymer film layer, for example. The constrained layer may be adhered to the PTFE layer, with a layer of adhesive, or the constrained layer may be adhered with heat, pressure, ultrasonics or other laminating means, depending upon the constrained layer construction.

9 Claims, 13 Drawing Sheets

VIBRATION DAMPING ARTICLE

FIELD OF THE INVENTION

The present invention generally relates to a vibration damping article comprised at least in part of polytetrafluoroethylene (PTFE).

BACKGROUND OF THE INVENTION

Vibration dampers are well known. Typical early vibration dampers were springs, and new applications using springs are still being developed. For example, as disclosed in U.S. Pat. No. 5,294,085, springs provide shock and vibration isolation to a motor vehicle seat assembly. Other types of vibration dampers include layers of elastomeric materials that absorb vibration energy. These type of dampers are being employed in new applications, such as in U.S. Pat. No. 5,332,371. As disclosed therein, noise curbing elements between flanges of pump support blocks are attached to a motor to quiet an axial piston and electric motor unit.

Also, large thick blocks of elastomeric materials are often used on isolation tables that help steady and isolate floor vibrations from sensitive optical equipment or sensitive balances, particularly those that weigh 0.01 mg or less. In this situation, the vibration is not a noise problem, but a performance problem. New vulcanized formulations for such elastomeric vibration dampers are also being developed and are comprised of ethylene, propylene, non-conjugated diene, rubber crosslinkers, selected allcoxy-silane compounds and silica or silicate.

Other material composites or constrained layer dampers have also been developed incorporating metal layers and resilient adhesive based layers. One such composite is used on the outside of many computer hard disk drives to reduce the noise of the drive within the computer. One reason these composites are placed on the outside of a hard disk drive is the confined space requirements. Also, and more importantly, some of the adhesive systems utilized in these constrained layer composite dampers outgas products which are detrimental to the long term reliability and operation of the hard disk drive.

Vibration dampers are also used in computers to help reduce vibration on printed circuit boards, as disclosed in U.S. Pat. No. 4,607,751. In the past, vibration dampers have been used to reduce vibration on spindle motors, as disclosed in U.S. Pat. No. 5,182,901. Recently, vibration dampers have been used in internal disk drive applications. One such vibration damper is a block of acrylic adhesive having a constrained polyester film layer which is positioned on a voice coil motor (VCM), between the VCM and a top cover of the disk drive. This internal vibration damper can have the advantage of absorbing vibration energy inside the disk drive prior to the buildup of resonate frequencies that exit the drive, however, the outgassing of adhesive by-products from such dampers will prohibit their use in environmentally sensitive disk drives.

Vibration dampers can also be designed to help guard the interior of a disk drive from external shock forces, such as by designing an outside jacket for the drive as disclosed in U.S. Pat. No. 5,149,048.

Another use for vibration dampers is on computer head gimbal assemblies (HGA). In this capacity, these dampers reduce the vibration in the HGA. As is well known, the head is the read/write head, and the gimbal arm positions the head over a data recording media. As flying heights, or air bearing separation between the head and disks, approach contact or near contact of less than 2 microinches and track widths become smaller and smaller, it is obvious that vibration dampers or vibrational effects on the HGA can impact data reading and writing integrity. Typical vibration dampers for HGAs include a constrained layer damper comprising an adhesive layer and metal layer such as stainless steel. Areas of concern for such dampers are, in addition to damping vibration, outgassing from the adhesive and the weight of such dampers. More particularly, weight is an important consideration as drive motors continue to decrease in size, especially in portable computers design and to improve battery life. Weight or inertia of the moving HGA is also important in data access times, in reading and writing data from and onto the disks. Additionally, weight is important in data integrity or accuracy in reading data from the ever increasing data recording density and ever decreasing data recording distances.

Vibration damping concerns for other data storage devices, such as optical disk drives and removable cartridge drives, for example, are similar to those for hard disk drives. However, removable cartridge drives are being designed to match hard drives in flying height and data recording density. Removable cartridge drives may have additional constraints. For example, the removable cartridge drive may not be as secure for the disks in the mount as in a hard disk drive, or the removable cartridge may be designed to float independently from the housing vibrations.

Vibration concerns are also important in the design of other electronic boxes and electronic control units. For example, vibration exerts undue stress on circuit connections and encapulants, such as epoxy castings which are used to protect electrical connections from corrosions, where cracks can be problematic.

Additionally, vibrations are also a design concern in optical equipment, speaker and microphone applications, and many other applications such as in mechanical systems including, but not limited, to automotive, nautical, aerospace, office equipment, and industrial applications where vibration may shorten life spans and where sound or noise may need to be controlled.

What is needed is an improved vibration damping article which is versatile, not only over the various vibration frequencies, but also in complimentary characteristics and features, such as inertness, chemical and temperature resistance or stability over broad ranges, low outgassing, and hydrophocity.

SUMMARY OF THE PRESENT INVENTION

The present invention advances the art of vibration damping material constructions known to date. In one aspect of the present invention, a vibration damping article comprises at least one layer of polytetrafluoroethylene (PTFE). The vibration damping article of the present invention may also comprise at least one adhesive layer for mounting to an object of interest. The vibration damping article of the present invention may also comprise at least one constrained layer, such as a metal or polymer film layer, for example. The metal layer may include, but is not limited to, steel, stainless steel, aluminum, copper, gold, silver, or titanium, for example. The polymer film layer may include, but is not limited to, polyester, polypropylene, polytetrafluoroethylene, nylon, polyethylene, or fluorinated ehtylenepropylene (FEP), for example. The constrained layer may be adhered to the PTFE layer, with a layer of adhesive, or the constrained layer may be adhered with heat, pressure, ultrasonics or other laminating means, depending upon the constrained layer construction.

BRIEF DESCRIPTION OF THE DRAWINGS

The foregoing summary, as well as the following detailed description of a preferred embodiment of the present invention, will be better understood when read in conjunction with the appended drawings. For purposes of illustrating the present invention, the drawings show an embodiment, which is presently preferred. It should be understood that the invention is not limited to the precise arrangement and instrumentality shown. In the drawings.

DETAILED DESCRIPTION OF THE INVENTION

Figure 1:
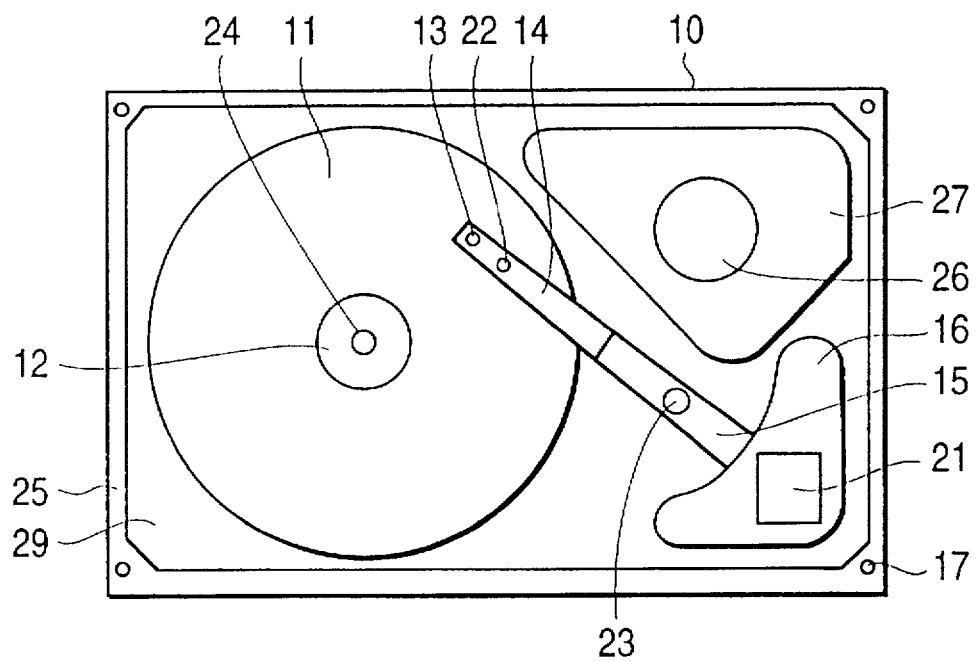
FIG. 1 is a view of an interior portion of a hard disk drive with a top cover removed.

Referring now to the drawings wherein similar reference characters represent similar objects throughout the Figures, the vibration damping article of the present invention is generally shown in a variety of applications within a computer hard disk drive 10. The hard disk drive 10 is conventional in design and includes a hard disk 11, a disk motor 12, a read/write head 13, a gimbal support arm 14, a support armature 15 and a voice coil motor (VCM) 16.

The vibration damping article is illustrated generally at 30 in FIGS. 3–6. As should be understood, the vibration damping article of the present invention may be used in any application requiring vibration damping and is not limited to the application illustrated and described herein. In a preferred embodiment of the present invention, the vibration damping article of the present invention can be fabricated directly from an expanded porous PTFE (ePTFE) material, or may be fabricated from a stock material which may be formed as described in detail hereinafter. As the term is used herein, expanded porous polytetrafluoroethylene (ePTFE) shall mean a membrane which may be prepared by any number of known processes, for example, by stretching or drawing processes, by papermaking processes, by processes in which filler materials are incorporated with the PTFE resin and which are subsequently removed to leave a porous structure, or by powder sintering processes. Preferably, the porous polytetrafluoroethylene membrane is porous expanded polytetrafluoroethylene membrane having a microstructure of interconnected nodes and fibrils, as described in U.S. Pat. Nos. 3,953,566; 4,187,390; and 4,110, 392, which are incorporated herein by reference, and which fully describe the preferred material and processes for making them. The porous polytetrafluoroethylene membrane may have a thickness in a range from about 3 to about 1,000 micrometers, preferably in a range of from about 5 to about 100 micrometers, and a pore volume in a range from about 20 to about 98 percent. In one embodiment of the present invention, stock from which the vibration damping article is formed is made from a process which consists of densifying one or more sheets or tapes comprised of ePTFE. Such a densification process is described in detail in U.S. Pat. No. 5,374,473, which is incorporated herein by reference.

The process of densifying one or more sheets or tapes of ePTFE substantially eliminates all the pores in the ePTFE while preventing cold flow or creep of the material as typically occurs in a conventional platen press. In addition, the node and fibril structure of the original ePTFE sheets or tapes, as evidenced by Differential Scanning Calorimetry (DSC) peaks at 327° C. and at 380° C., is retained.

Without intending to limit the scope of the present invention, one contemplated process for the densification of the sheets or tapes of ePTFE may be accomplished by placing one or more sheets or tapes of ePTFE inside a heat and pressure stable flexible container. Thereafter, gases are evacuated from the interior of the container until a predetermined negative pressure in the container is obtained. The flexible container is then subjected to a predetermined pressure and temperature. The sheets are then cooled in the container while reducing the pressure on the container.

Densification of the sheet(s) or tape(s) of ePTFE into stock may be accomplished at times varying from about 15 minutes to in excess of four hours, at temperatures ranging from about 330° C. to about 390° C., and at pressures from about 150 psi to about 350 psi. One skilled in the art will recognize that there exists a relationship between the thickness of the stock being formed, and the times, temperatures, and pressures which are most effective for its formation. In particular, it should be understood that excessively high temperatures or long times may cause the loss of the node and fibril structure originally present in the ePTFE, and therefore, a return to poorer PTFE physical properties. Conversely, inadequate process conditions will result in only partial densification, and in some cases, formation of a stock comprising a skin of dense material over a partially densified core. In such cases, the stock is often, but not always, non-uniform in appearance. If uniform, this dense shim over partially densified core could be a constrained layer of all PTFE construction.

It should be understood that an autoclave chamber can be replaced with a platen press which has been equipped with a vacuum enclosure which permits the evacuation of air and gases from the layers of ePTFE being placed under heat, pressure or both.

It should be further understood that the teachings of the present invention contemplate other methods for the manufacture of stock material from which a vibration damping article may be produced. For example, such other methods include but are not limited to, processes which make use of a single or multiple layer(s) of ePTFE which are densified and are thermally locked or bonded, as well as materials which are not thermally locked or bonded. Furthermore, it is believed that processes may be utilized which enable a vibration damping article to be made of stock of one or more ePTFE layers which have not been densified, but are thermally locked, or which have not been thermally locked or bonded. It is foreseen that any or all of these methods could be used in the fabrication of a vibration damping article which is dense and thermally locked or bonded.

In one embodiment of the present invention, the vibration damping article comprises a sintered, densified, expanded polytetrafluoroethylene, exhibiting remnants of a fibril and node structure as characterized by peaks at about 327° C.

and about 380° C. in a thermograph of differential scanning calorimetry in the course of a temperature rise of 10° C./min., and having a characteristic density of about 2.1 g/cc, or such an appropriate characteristic density for a full density non-expanded, non-porous PTFE shaped article. However, it is contemplated that the vibration damping article may be produced to a density which is less than full density, as required by a given application.

For example, in another embodiment the density could easily be lower, for example, 0.2 g/cc. There can be tradeoffs between damping effectiveness and weight constraints such that optimized balances can be obtained.

The vibration damping article 30 may have disposed on at least one surface thereof a layer of pressure sensitive or heat meltable adhesive 32 to facilitate mounting to an object of interest.

Figure 2:
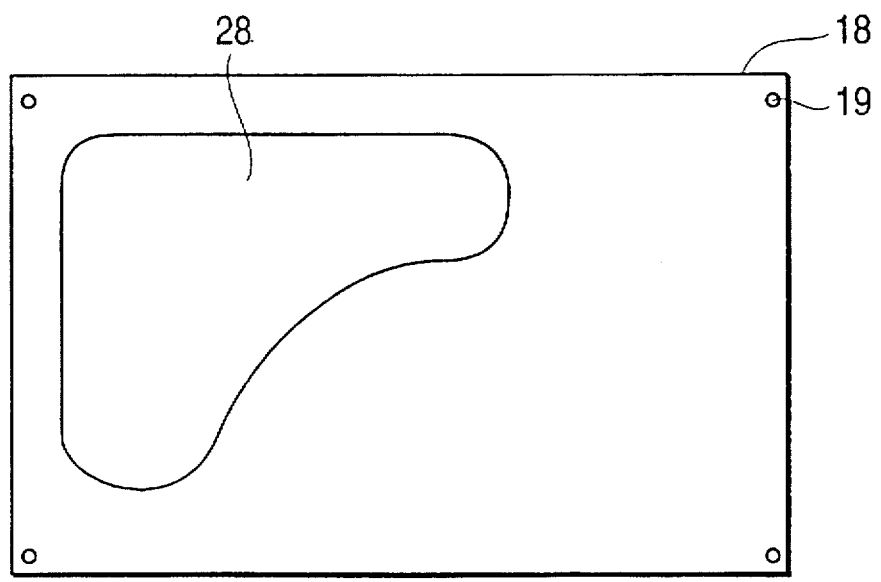
FIG. 2 is a view of the top cover of the hard disk drive illustrated in FIG. 1.
Figure 3:
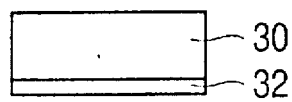
FIG. 3 is a view of a first embodiment of the present invention.

As best seen by reference to FIGS. 1 and 2, the vibration damping article 30 may be positioned in a variety of locations within a computer hard disk drive. For example, the vibration damping article can be placed on top of the VCM 16 as illustrated by position 21. In this application, the vibration damping article 30 reduces vibrations within the drive. Adhesive layer 32 may mount the vibration damping article 30 to the VCM, or the vibration damping article 30 may be placed on the VCM and later clamped in place by a top cover 18 (FIG. 2) by means of screws through holes 17 and 19. Referring also to FIG. 1, the vibration damping article 30 may be attached to the bottom base plate 29, at such locations as quarter portions 26 and 27.

The vibration damping article 30 of the present invention may be used as a combination vibration damper/gasket, which is illustrated at 25 in FIG. 1. This use can be very successful for damping vibration within the drive, as it surrounds the entire outside perimeter of the drive, and as such, effectuates vibration damping around all potential sources within the drive, or vibrations generated outside the drive.

Figure 4:
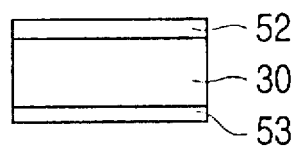
FIG. 4 is a view of an alternate embodiment of the present invention.

Constructions of the vibration damping article 30, as shown in FIG. 4, may comprise adhesive layers 52 and 53, such that once the top cover 18 is applied to the base plate 29, the disk drive 10 is sealed by the combination of adhesives and vibration damping article.

Additional areas of use in FIG. 1 are areas 22 and 23 on the head gimbal assembly (HGA) 14, and armature 15, respectively. The vibration damping article is disposed at these locations for improved performance, rather than for sound damping. Performance of the drive depends upon the speed and accuracy of the head 13 to be able to read and write data from the recording media disks 11. The typical flying height or distance between the head and disks is less than 0.000002" (e.g., about 0.000051 mm). Vibrations on the armature that causes undesired movement of the position of the head is detrimental to the ability to accurately read and write data within the small data tracks on the disk.

Still another location for a vibration damper within a computer hard disk drive is in a location 24 on the disk motor 12 as illustrated in FIG. 1. Since the disk motor is a source of vibration within the drive, a vibration damper directly on this motor may be effective in reducing the vibration effects on other elements in the drive. Vibration dampers for computer hard disk drives can also be placed outside the drive, as in location 28 on the outside of the top cover 18 in FIG. 2.

Figure 5:
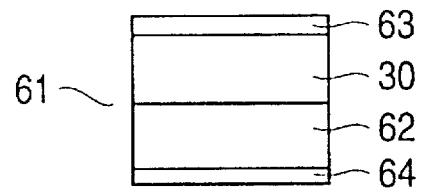
FIG. 5 is a view of an alternate embodiment of the present invention.

FIG. 5 illustrates a constrained layer embodiment of the present invention where layer 62 is a layer of ePTFE. Layer 64 is a mounting adhesive. Layer 61 is an adhesive which mounts layer 62 to a constraining layer 63. Layer 63 may be comprised of metal layers, such as but not limited to aluminum, steel, stainless steel, copper, zinc, gold, titanium, or alloys that may be merely constraining layers or add additional function such as inertness or reactivity as desired for an application, for example; or a polymer film layer, such as but not limited to polyester, polypropylene, PTFE, polyethylene, nylon, or for example fluorinated ethylenepropylene.

FIGS. 6–16 graph test results comparing the vibration damping article of the present invention to a commercially available viscoelastic vibration constrained layer damper that is currently sold into the computer hard disk drive industry as a vibration damper.

Figure 17:
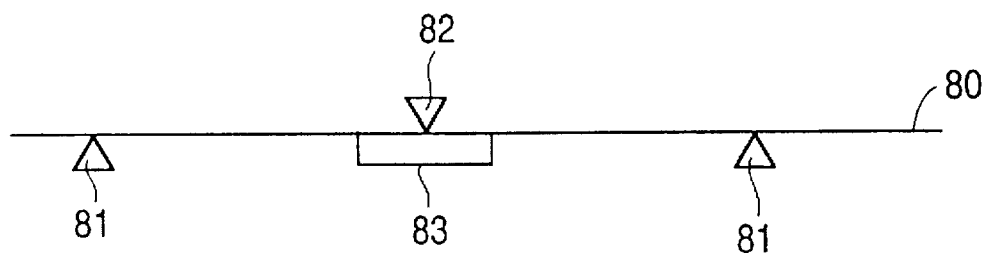
FIG. 17 is a view of a three-point bend test employed.
Figure 6:
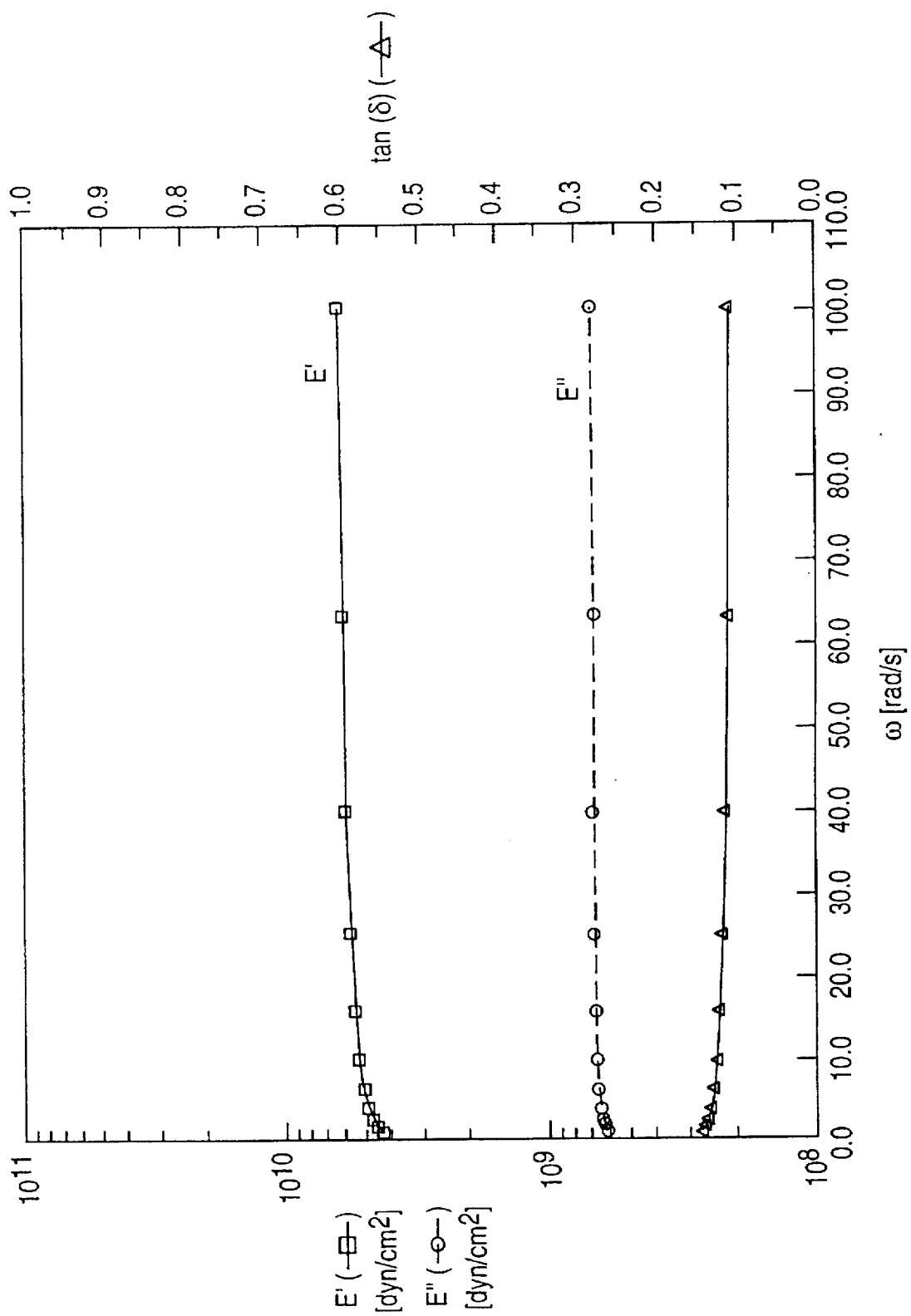
FIGS. 6–16 are graphs of test data for various embodiments of the present invention compared with known damping articles.
Figure 7:
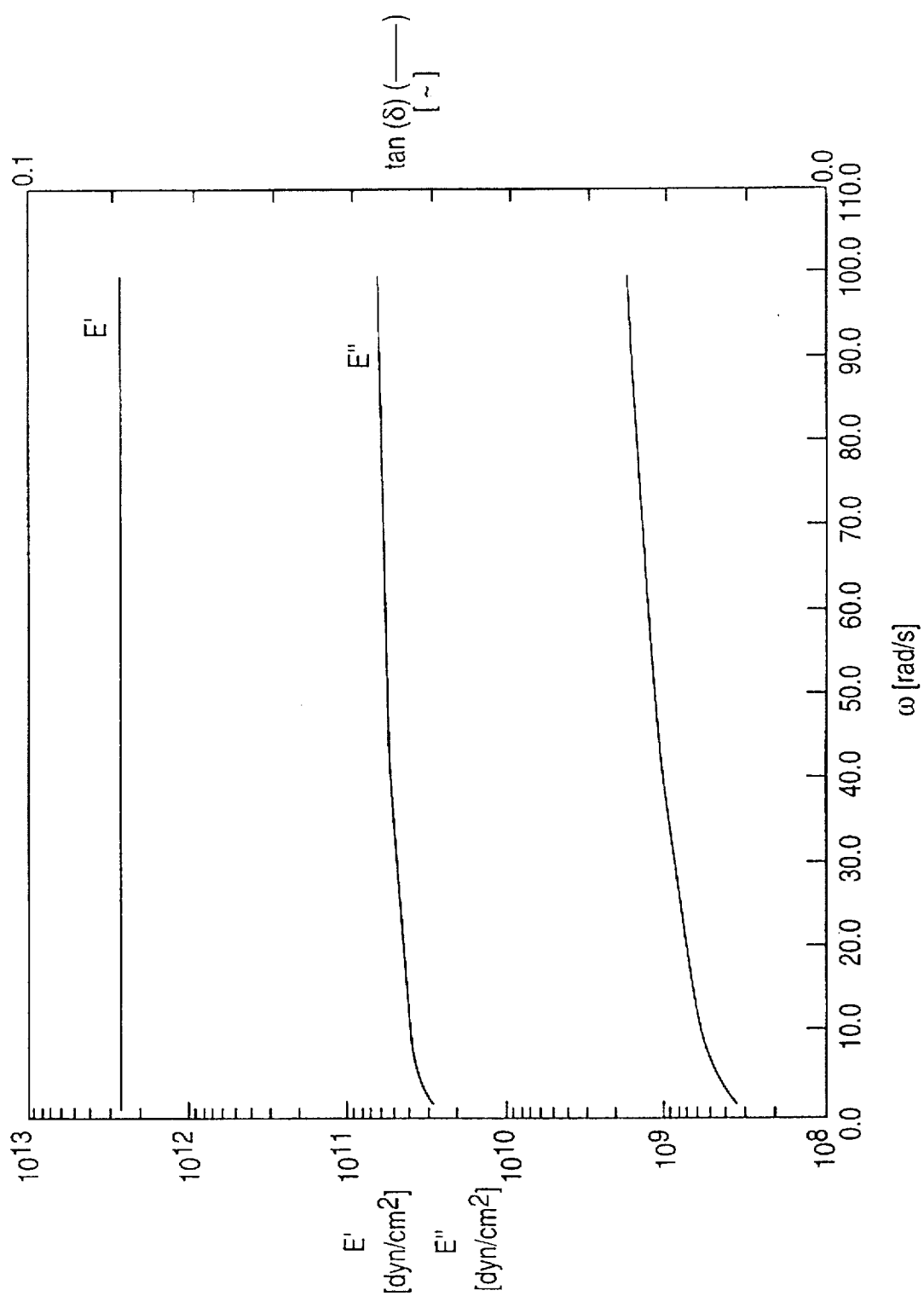
Figure 8:
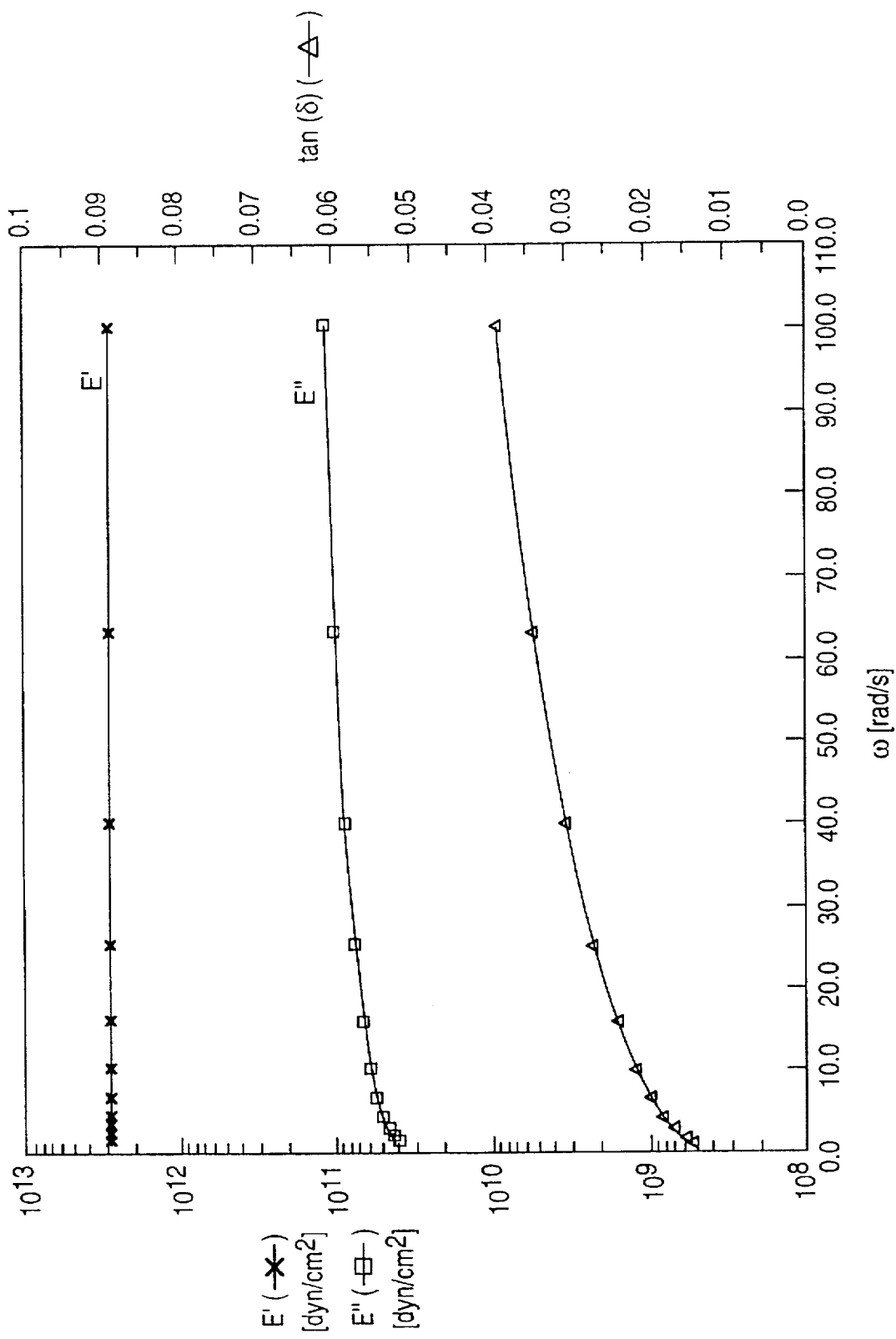
Figure 9:
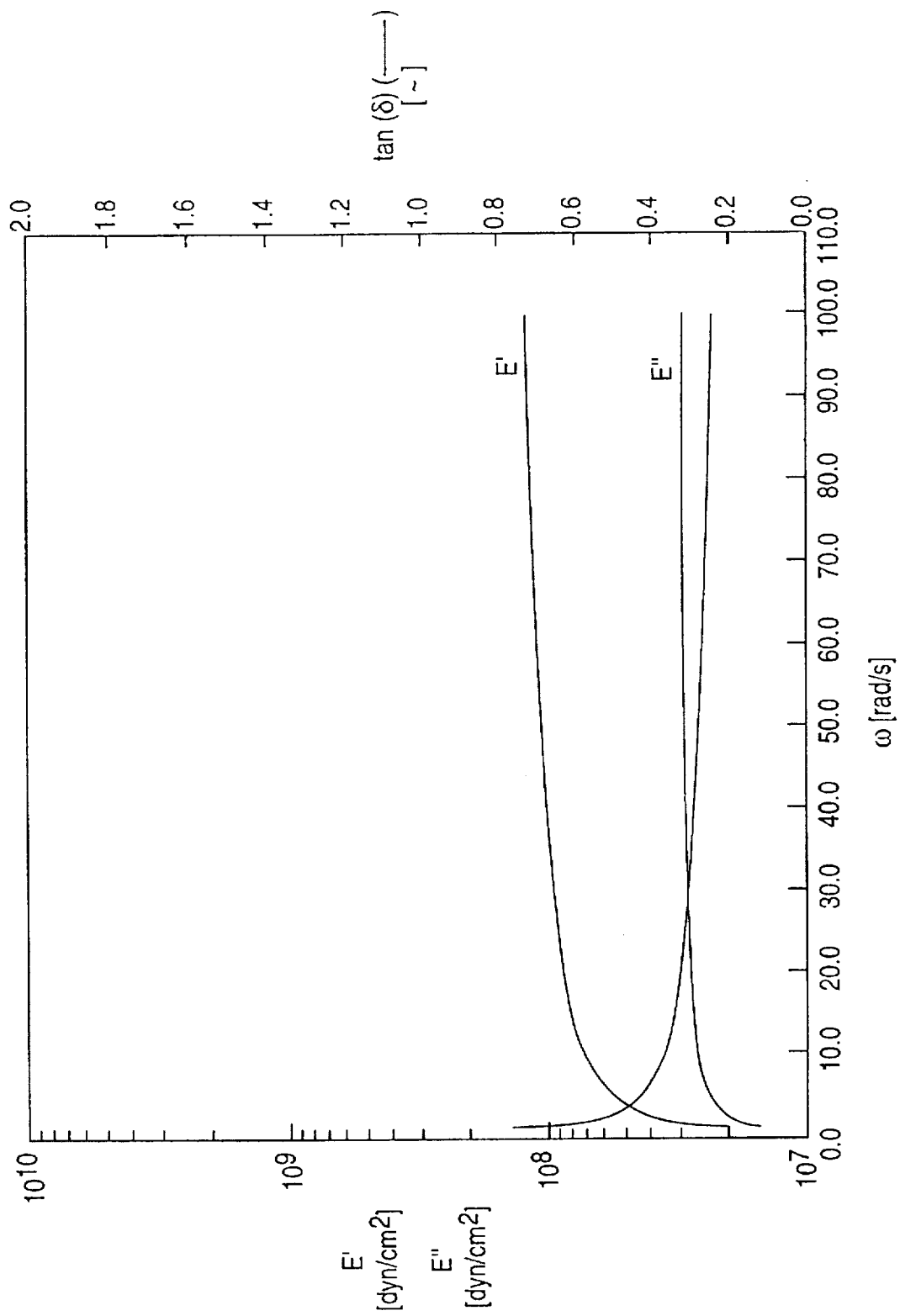
Figure 10:
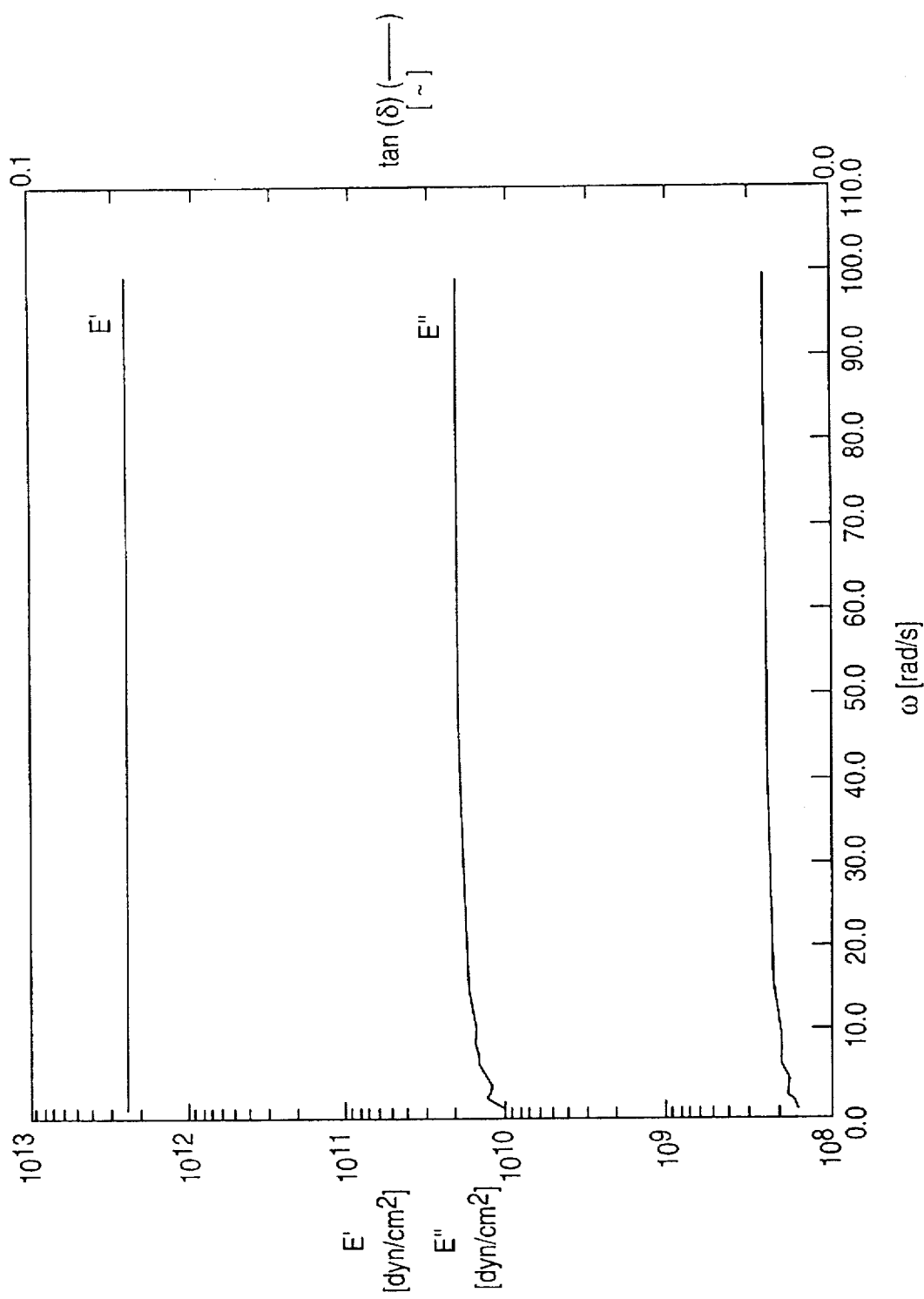
Figure 11:
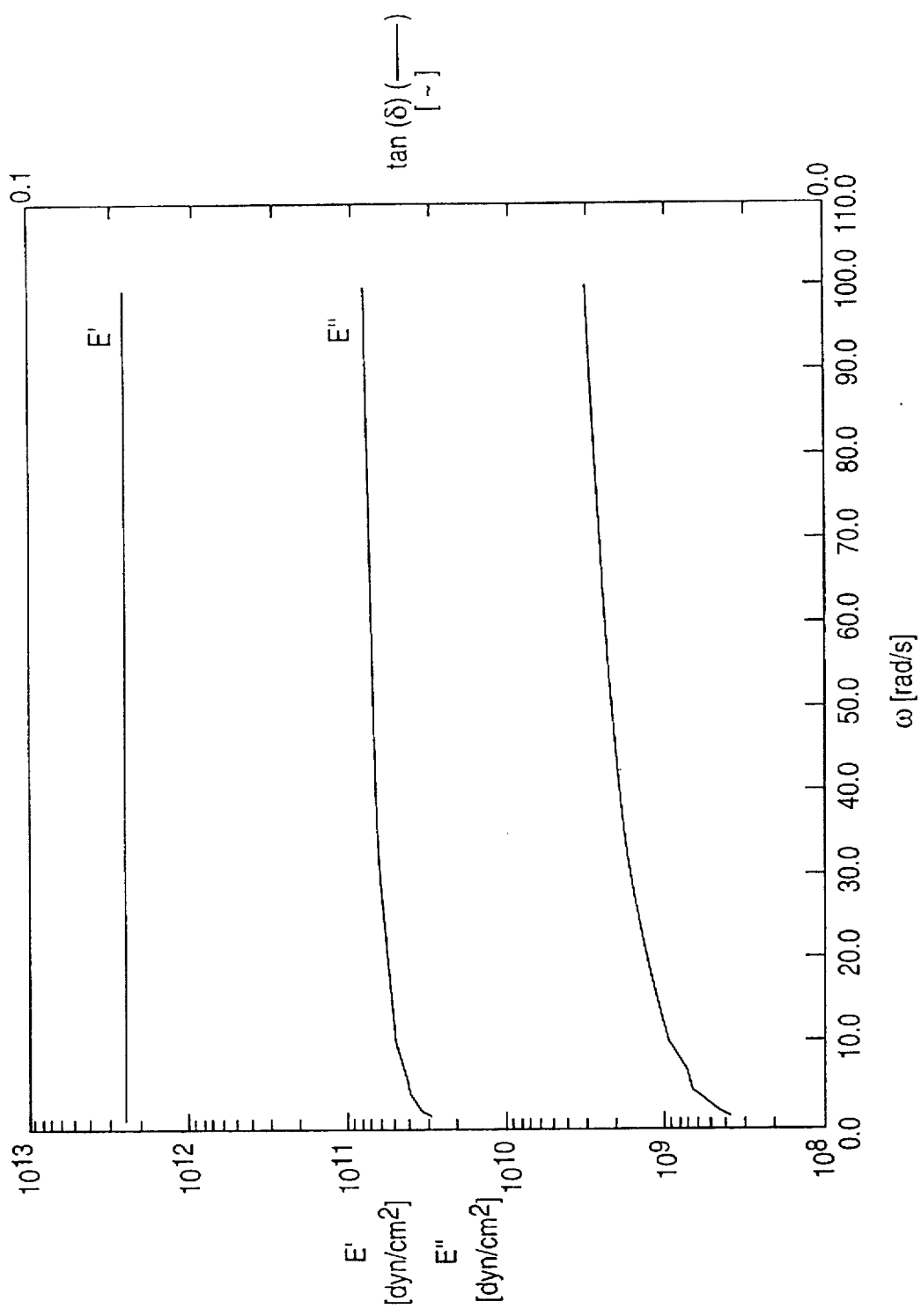
Figure 12:
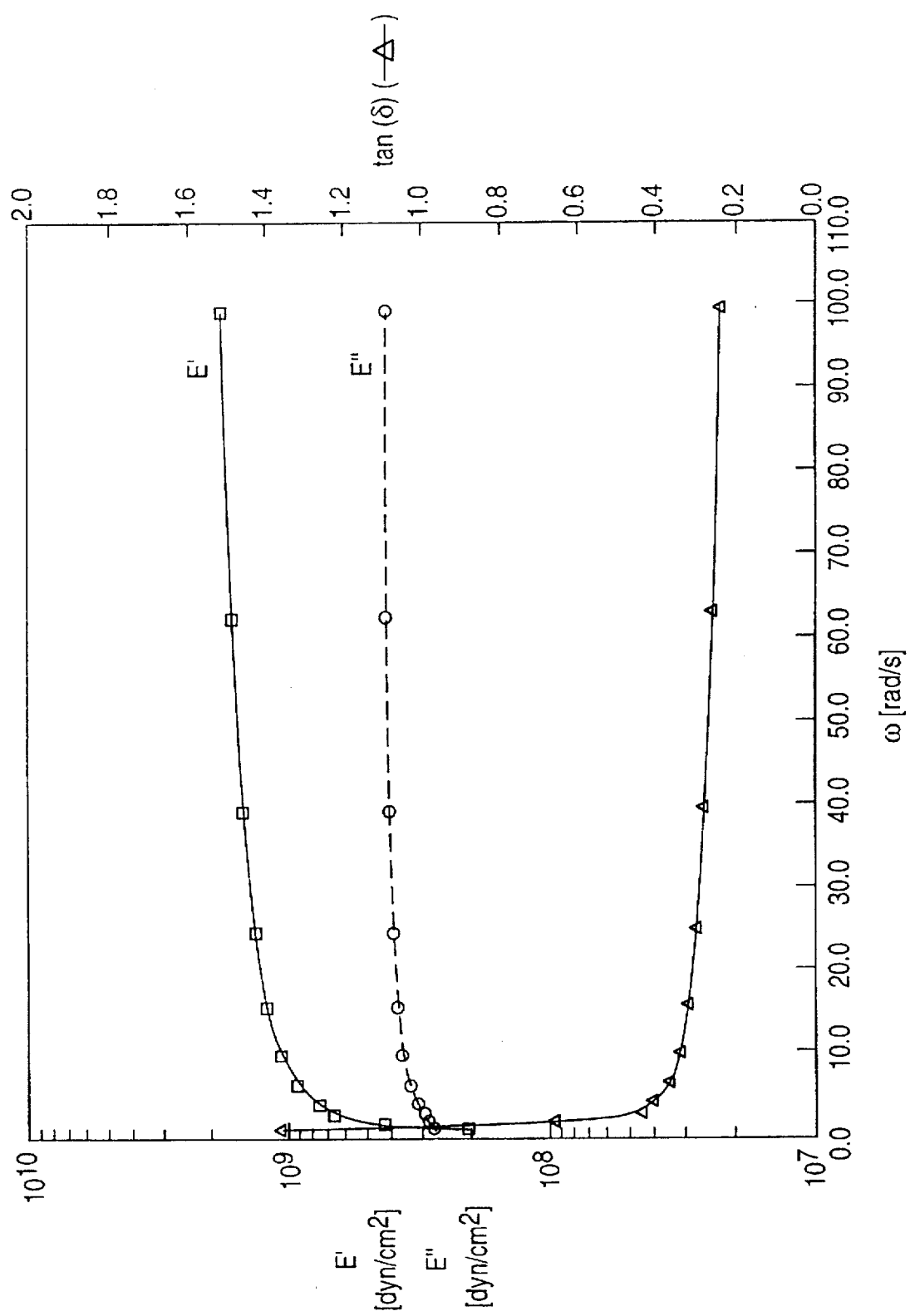
Figure 13:
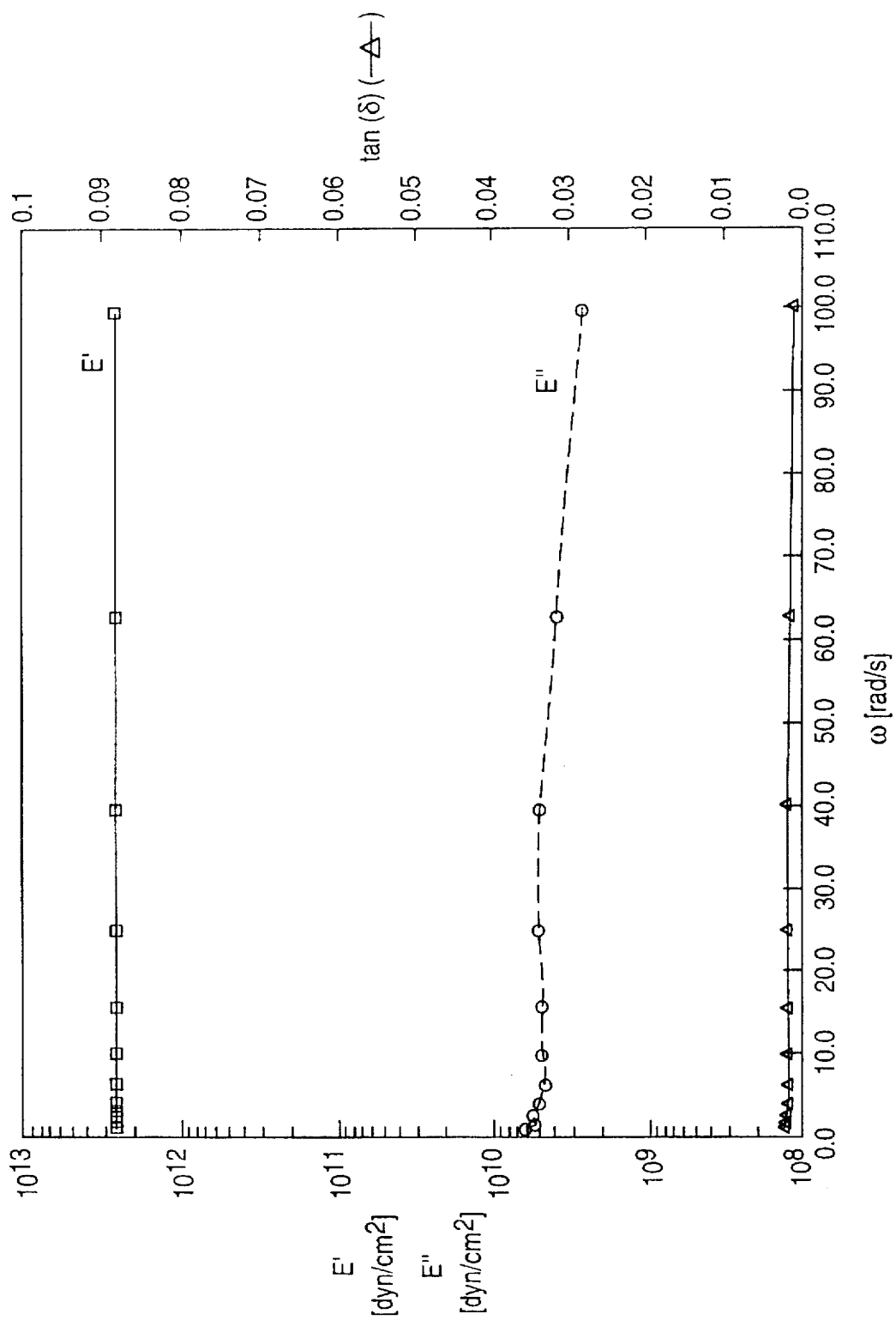
Figure 14:
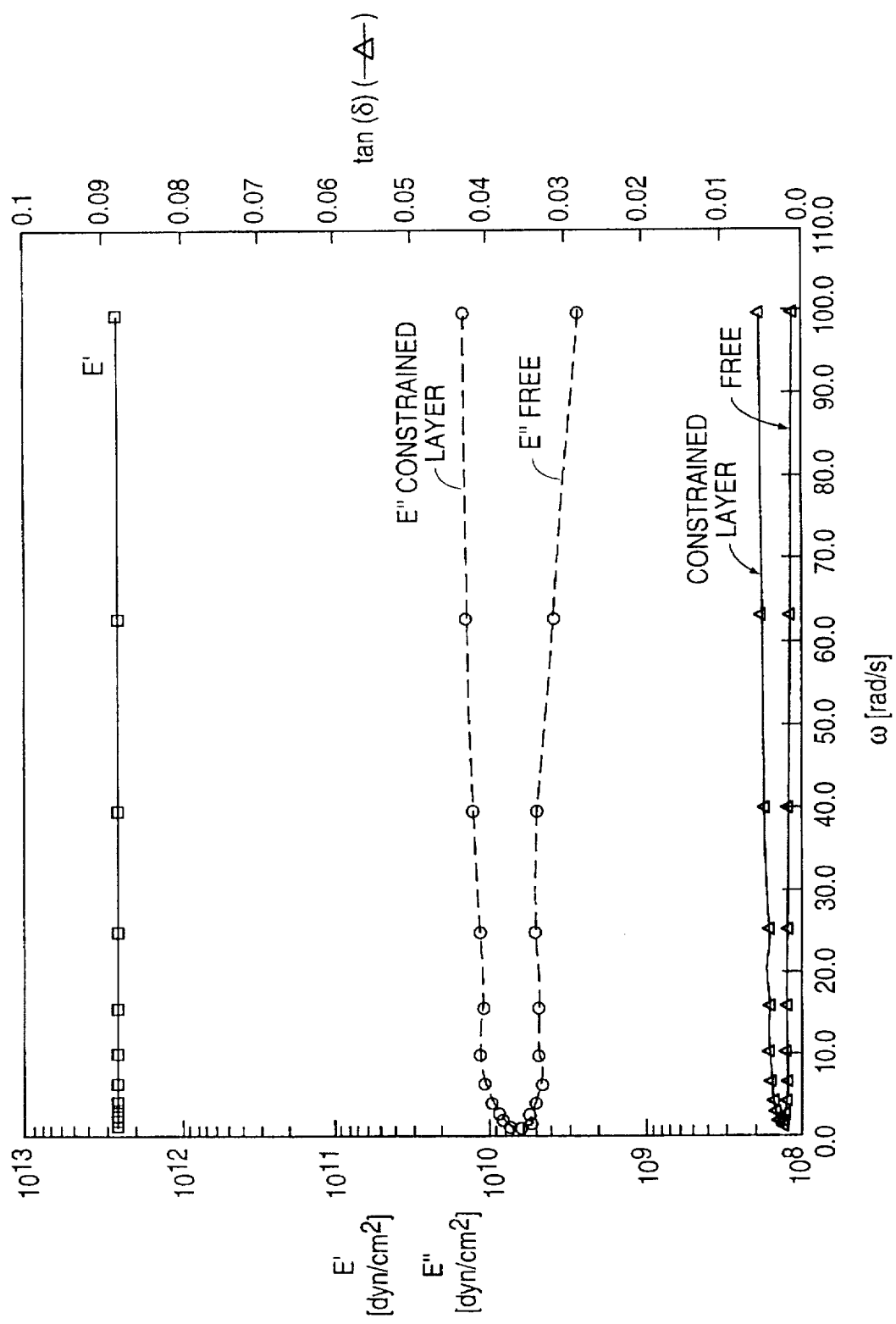

FIG. 17 is a view of a three-point bend test where 80 is the steel shim, 81 are knife edge supports, 82 is the load supplied, and 83 is the sample being tested.

Examples of the present invention were evaluated using a Dynamic Mechanical Analyzer (DMA) manufactured by Rheometric Scientific (formerly Polymer Labs and Rheometrics). The DMA is referred to as the Rheometric Solids Analyzer (RSA) II and is typically used to measure Storage and Loss Modulii of material systems over a wide temperature and frequency range. The RSA II software calculates the force response phase lag delta vibration, which may be used to calculate the ratio of dissipative and purely elastic forces (Tan delta). Tan Delta therefore, provides a geometrically independent measurement of the material's loss factor.

Materials were evaluated using two testing techniques; Fiber Film and a three-point bend. The Fiber Film technique tested 10 mm long samples of materials in tension (0.04% strain and 30 gr. preload) to determine Storage and loss Modulii and thereby, Tan delta. This testing technique provides geometrically independent measurements for all dynamic mechanical properties.

The standard three-point bend tests were modified to closely simulate a typical damping application of a vibrating plate. In one three-point bend test, a composite beam was simply supported on knife edges (spaced 1.89 inches apart) and loaded on its center (from the top side) by another knife edge. The composite beam is comprised of a 0.50 inch wide 0.02 inch thick steel shim beam with the material system being tested adhesively bonded to it. (FIG. 17)

The test material was cut to a demension of 0.75 inch long and 0.50 inch wide to match the width of the steel shim and adhesively bonded to the underside of the steel shim. This was accomplished by using a double sided pressure sensitive adhesive comprising one layer of 0.001 inch thick acrylic adhesive on both sides of a 0.002 inch thick polyester film. The material system sample was visually centered under the loading knife edge in the RSA II instrument. The composite beam assembly was preloaded to 100 gr. (compression) and the amplitude of the oscillatory strain was 0.005% (0.04 mm peak amplitude of displacement). Tests were run a room temperature between 1–100 rad/sec. (about 1–30 Hz).

This test procedure provides a simple and accurate method for qualitatively comparing the vibration damping performance of various sample material systems and configurations. Materials tested in both free and constrained layer state. The free state places the material sample in tension while the constrained layer induces sheer stresses in the material sample.

Without intending to limit the scope of the present invention, the apparatus and method of production of the present invention may be better understood by referring to the following examples and test results of those samples:

EXAMPLE 1

A layer of densified ePTFE was made in accordance with U.S. Pat. No. 5,374,473 to a thickness of 0.055 inch (0.14 cm) and was cut to a size of 0.50 inch by 0.75 inch (1.27 cm×1.91 cm). It was tested on the DMA as described above. For the three-point bend test, it was mounted to the steel shim as described in the test method. Graphic results, at room temperature runs for both constrained and unconstrained three-point bend tests and material fiber film tests, are included as FIGS. 6–8.

EXAMPLE 2

A layer of expanded PTFE made in accordance to U.S. Pat. Nos. 3,953,566; 4,187,390; and 4,110,392 was made to a density of 0.25 gm/cc and thickness of 0.065 inch to 0.070 inch thick (1.65 cm–1.90 cm). It was cut to the same size and tested as in Example 1, above. Graphic results for these tests are included as FIGS. 9–11.

EXAMPLE 3

Figure 15:
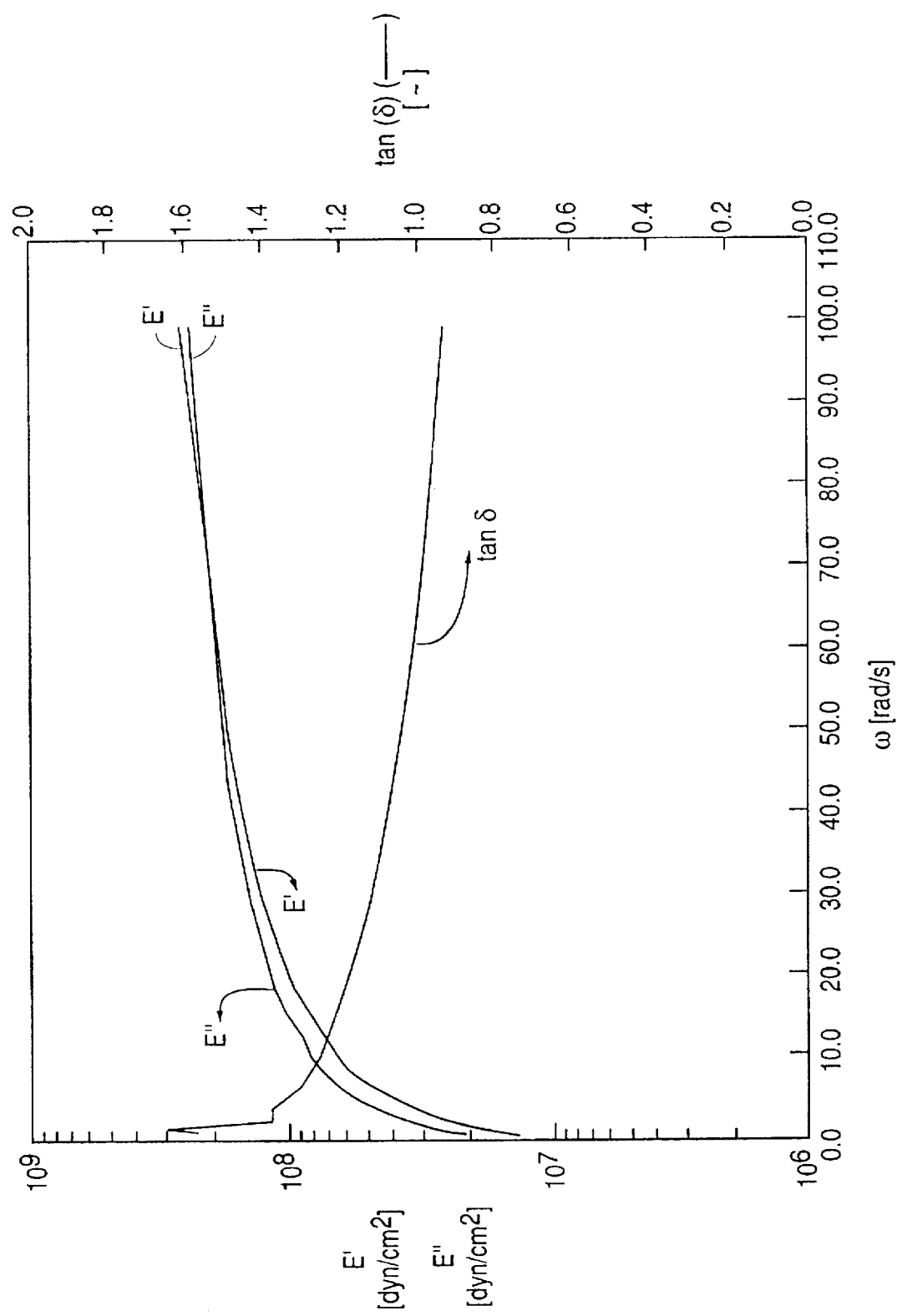
Figure 16:
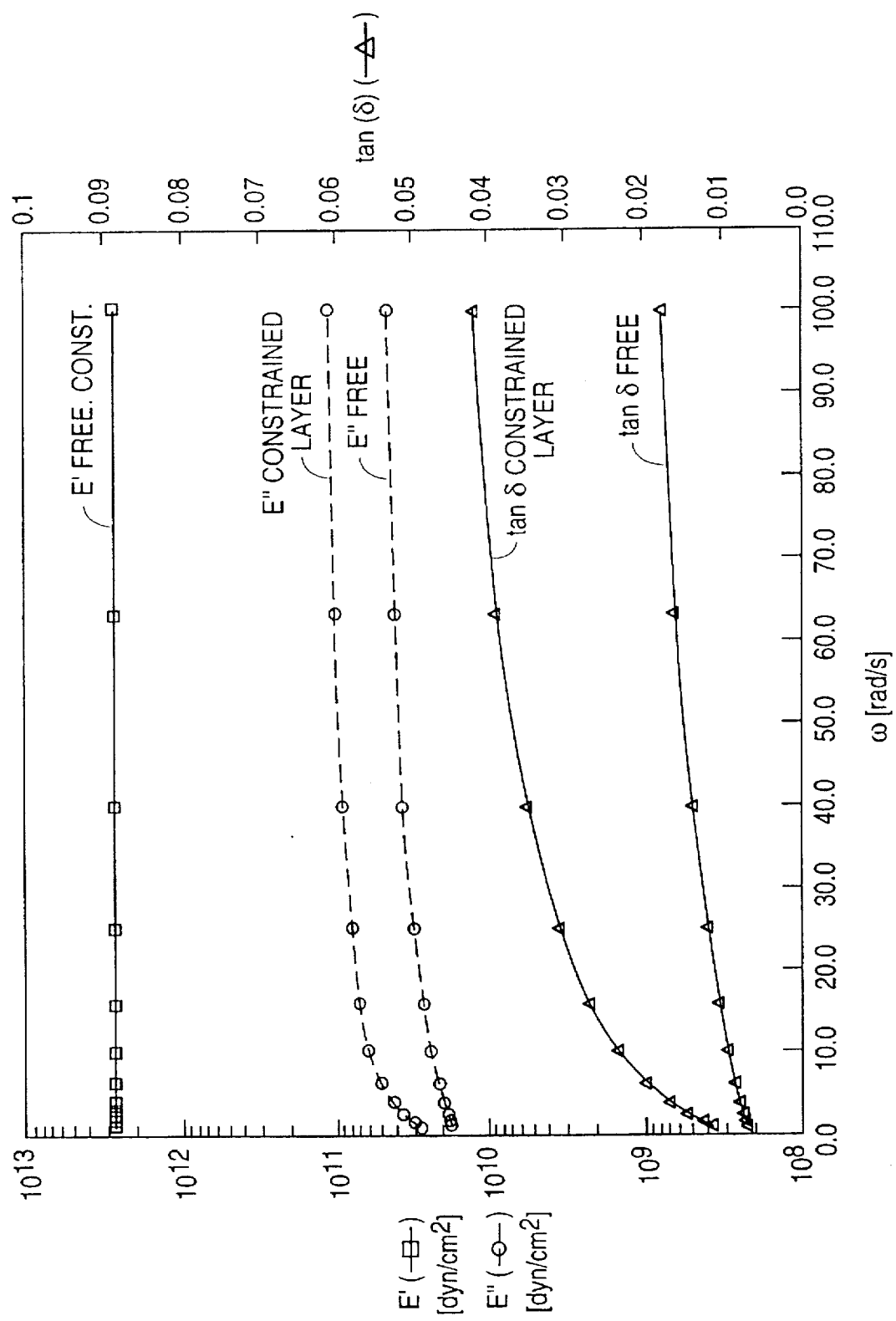

A layer of expanded PTFE was made in accordance with Example 2, but to the thickness of 0.010 inch (0.25 cm), and was tested as described hereinabove. Graphic results for these tests are included in FIGS. 12–14. Comparative commercial data for a conventional damper is shown in FIGS. 15–16.

Clearly these examples show vibration damping, but should not be limiting in scope to the present invention. Obviously different layer and mounting techniques can be employed with the present invention to optimize performance or ease of assembly for any given application.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. A hard disk drive comprising a base plate, a disk motor, a support armature adapted to carry a head gimbal assembly with a read/write head, and a vibration damping article having at least one layer of densified, expanded polytetrafluoroethylene, exhibiting remnants of a fibril and node structure as characterized by peaks at about 327° C. and about 380° C. in a thermograph of differential scanning calorimetry in the course of a temperature rise of 10° C./min., and having a characteristic density of about 2.1 g/cc.

2. The hard disk drive of claim 1, said vibration damping article further comprising at least one adhesive layer disposed on a surface of the at least one layer of densified, expanded polytetrafluoroethylene.

3. The hard disk drive of claim 2, wherein the adhesive layer comprises an acrylic adhesive.

4. The hard disk drive of claim 2, wherein the adhesive layer is a material selected from a group consisting of: thermoset and thermoplastic adhesives.

5. The hard disk drive of claim 1, the vibration damping article further comprising at least one constrained layer.

6. The hard disk drive of claim 5, wherein the constrained layer comprises a metal.

7. The hard disk drive of claim 6, wherein the metal is selected from a group consisting of: aluminum, steel, stainless steel, copper, gold, silver and titanium.

8. The hard disk drive of claim 5, wherein the constrained layer comprises a polymer film.

9. The hard disk drive of claim 8, wherein the polymer film is selected from a group consisting of: polyester, polypropylene, polyethylene, polytetrafluoroethylene, nylon and fluorinated ethylenepropylene.

* * * * *